US011139953B2

(12) United States Patent
Mao et al.

(10) Patent No.: US 11,139,953 B2
(45) Date of Patent: Oct. 5, 2021

(54) METHODS AND APPARATUS FOR SECURE AND EFFICIENT IMPLEMENTATION OF BLOCK CIPHERS (71) Applicant: BEIJING LIANSHI NETWORKS TECHNOLOGY CO., LTD., Beijing (CN)

(72) Inventors: Wenbo Mao, Beijing (CN); Xiaoyong Bai, Beijing (CN); Long Wen, Beijing (CN)

(73) Assignee: BEIJING LIANSHI NETWORKS TECHNOLOGY CO., LTD., Beijing (CN)

( * ) Notice: Subject to any disclaimer, the term of this patent is extended or adjusted under 35 U.S.C. 154(b) by 310 days.

(21) Appl. No.: 16/483,557

(22) PCT Filed: Apr. 12, 2017

(86) PCT No.: PCT/CN2017/080318
§ 371 (c)(1),
(2) Date: Aug. 5, 2019

(87) PCT Pub. No.: WO2018/188002
PCT Pub. Date: Oct. 18, 2018

(65) Prior Publication Data
US 2020/0099510 A1 Mar. 26, 2020

(51) Int. Cl.
*H04L 9/14* (2006.01)
*H04L 9/06* (2006.01)
(52) U.S. Cl.
CPC .......... *H04L 9/0631* (2013.01); *H04L 9/0625* (2013.01); *H04L 9/14* (2013.01); *H04L 2209/12* (2013.01); *H04L 2209/24* (2013.01)

(58) Field of Classification Search
CPC ... H04L 9/0618; H04L 9/0625; H04L 9/0631; H04L 9/14; H04L 9/16; H04L 2209/12; H04L 2209/125; H04L 2209/24
See application file for complete search history.

(56) References Cited

U.S. PATENT DOCUMENTS

2009/0003589 A1  1/2009  Mathew et al.
2009/0214024 A1  8/2009  Schneider
2015/0341168 A1* 11/2015  Gueron ............... H04L 9/14
                                           380/28

FOREIGN PATENT DOCUMENTS

CN      103684748 A     3/2014

OTHER PUBLICATIONS

Bogdanov; "ALE: AES-Based Lightweight Authenticated Encryption"; 2013; p. 447-466; Springer, Berlin, Heidelberg.
(Continued)

*Primary Examiner* — Minh Dinh
(74) *Attorney, Agent, or Firm* — Hayes Soloway P.C.

(57) ABSTRACT

A method of and apparatus for executing a cryptographic cipher is described. The method includes acts of receiving a first finite field of data and key value represented by a first encryption standard including a first and second operation, transforming the first finite field of data and key value into a second finite field of data and key value represented by a second encryption standard, transforming the first operation and the second operation into a first modified operation and a second modified operation represented by the second encryption standard, executing the first modified operation on the second finite field of data and key value to generate a third finite field of data, executing the second modified operation on the third finite field of data to generate a fourth finite field of data, which is transformed into a fifth finite field of data represented by the first encryption standard.

45 Claims, 3 Drawing Sheets

(56) References Cited

OTHER PUBLICATIONS

Satoh; "Unified Hardware Architecture for 128-Bit Block Ciphers AES and Camellia"; 2003; p. 304-318; Springer, Berlin, Heidelberg.
"Decision of Patent Grant"; dated Aug. 8, 2019; 1 page.
"Decision of Patent Grant"; dated Jun. 28, 2019; 1 page.
"Notification of Reasons for Refusal"; dated Jul. 24, 2019; 2 pages.

* cited by examiner

METHODS AND APPARATUS FOR SECURE AND EFFICIENT IMPLEMENTATION OF BLOCK CIPHERS

BACKGROUND OF INVENTION

1. Field of Invention

The present invention relates generally to systems and methods for data encryption and decryption.

2. Discussion of Related Art

Data encryption is a known process of encoding privileged information such that only authorized parties may decrypt and access the information. Many algorithms for encryption and decryption, generally referred to as ciphers, have been developed to encode and decode privileged information, including the Advanced Encryption Standard (AES) cipher, the SM4 (formerly SMS4) cipher, and others.

The AES and SM4 ciphers are similar in several aspects. For example, both ciphers utilize symmetric, secret keys to perform both encryption and decryption of data represented by Galois fields (i.e., finite fields) of identical lengths, differing only by the definitions of their respective polynomials. Furthermore, both ciphers incorporate a substitution function and a permutation function to transform input data during the encryption or decryption operations. The substitution function performs a "confusion" operation by obscuring the relationship between a key value and the information being encrypted or decrypted, and the permutation function performs a "diffusion" operation by shuffling, transposing, and mixing constituent elements (e.g., bits) of the key value and the information being encrypted or decrypted.

Generally speaking, substitution functions involve highly-complex computations executed on small quantities of data, and permutation functions involve simple computations executed on large quantities of data. Executing the two functions completes a single round of encryption or decryption of an input data set, where a complete encryption or decryption operation will typically involve a specified plurality of rounds.

Rather than executing the highly-complex substitution function in program runtime, which is computationally burdensome, a lookup table can be used instead to map a given input value to a pre-computed output value listed in a lookup table, significantly reducing computational complexity. However, use of a lookup table may expose the cipher to certain types of malicious attacks, including side-channel attacks, designed to compromise a system's security and gain access to restricted information. In a side-channel attack, the attacking process can derive secret key information by observing the physical effects of a cipher running on the same platform as the attacking process, such as by observing power consumption, heat production, acoustic stimuli, and so forth. The attacking process can, for example, observe the cipher's access to lookup table memory address values and derive the secret key value therefrom.

Encryption and decryption operations executed using the AES cipher are protected against these side-channel attacks by the AES New Instruction Set (AES-NI), an extension to AES. Under AES-NI, the substitution operation is executed in an isolated hardware environment over a fixed interval of time to reduce or eliminate the efficacy of a side-channel attack.

Encryption and decryption operations executed using the SM4 cipher, however, remain vulnerable to the side-channel attacks during execution of the substitution operation. Therefore, although the permutation function of the SM4 cipher can achieve highly efficient data diffusion relative to the permutation function of the AES cipher, the practicality of the SM4 cipher is significantly limited by the relative insecurity of the substitution function. In view of the foregoing, it is to be appreciated that, for certain input data sets, it would be advantageous to perform the substitution operation using AES-NI and to perform the permutation operation using the SM4 cipher.

Figure 1:
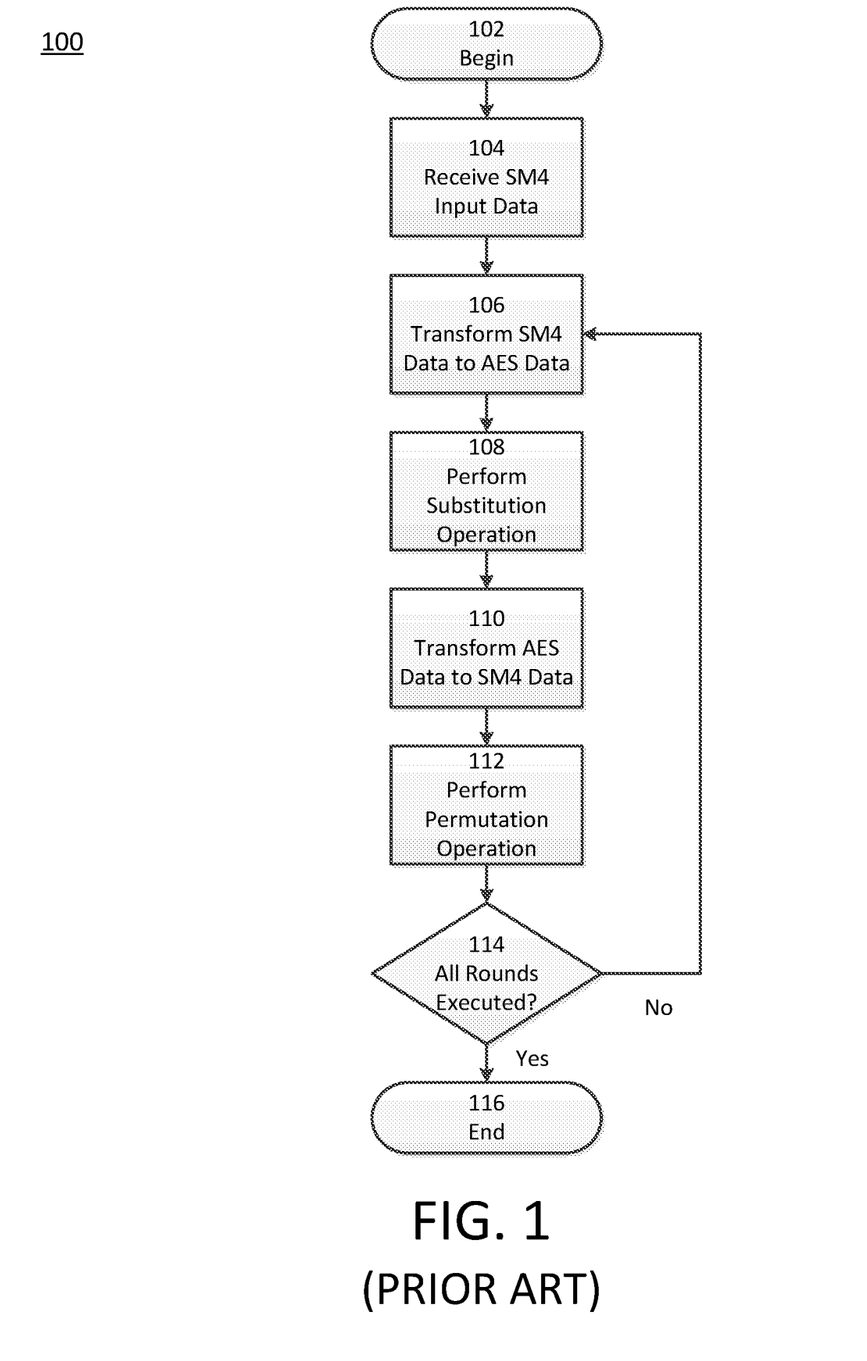
FIG. 1 is a process of executing a cryptographic cipher according to the prior art.

FIG. 1 illustrates a process 100 of encrypting an SM4 input data block using the AES and SM4 ciphers according to the prior art. The process 100 may be executed by a system executing the encryption operation, and includes acts of receiving SM4 input data, transforming the SM4 data into AES data, performing a substitution operation, transforming the AES data to SM4 data, performing a permutation operation, and repeating the process until a specified number of rounds have been executed.

At act 102, the process 100 begins. At act 104, an input data set structured according to the SM4 cipher is received. At act 106, the input data set structured according to the SM4 cipher is transformed into a data set structured according to the AES cipher. As will be described in greater detail below, both the SM4 and the AES ciphers are executed on data structured according to identical-length, mathematically-isomorphic Galois fields, which allows data to be transformed between AES and SM4.

At act 108, the AES substitution operation is executed on the AES data. At act 110, the AES data that has undergone the substitution operation is transformed back into SM4 data. At act 112, the SM4 permutation operation is executed on the SM4 data, demarcating the end of one round of the encryption operation. At act 114, a decision is made as to whether all of the encryption rounds have been executed. If more rounds are to be executed, the process 100 returns to act 106. Otherwise, the process 100 ends at act 116.

The foregoing approach trades the added security of executing the substitution operation using AES-NI for high execution times and high computational complexity. Every round of the encryption operation requires each byte of SM4 input data to be transformed to AES and to be subsequently transformed back to SM4 by executing a matrix-vector multiplication operation for each transformation. Where the prior art solution is employed to encrypt a total of 16 bytes of data over 32 rounds of encryption, a total of 256 matrix-vector multiplication operations are executed just to transform data between SM4 and AES. For some systems, the burden of executing such a significant number of operations may outweigh the security benefits realized by AES-NI. Accordingly, there exists a need for a system that takes advantage of the security benefits of AES-NI without introducing excessively burdensome computation times and complexity.

SUMMARY OF THE INVENTION

At least one aspect of the present disclosure is directed to a method of executing a cryptographic cipher, including acts of receiving a first finite field of data and a first finite field of a key value each represented according to a first encryption standard, the first encryption standard including a first operation and a second operation, transforming the first finite field of data represented by the first encryption standard into a second finite field of data represented according to a second encryption standard, transforming the first field of the key value represented by the first encryption standard into a second finite field of a key value represented according to the second encryption standard, transforming the first operation into a first modified operation represented according to the second encryption standard, transforming the second operation into a second modified operation represented according to the second encryption standard, performing a data modification operation on the second finite field of data and the second finite field of key value, the data modification operation including acts of executing the first modified operation on the second finite field of data and on the second finite field of key value to generate a third finite field of data, and executing the second modified operation on the third finite field of data to generate a fourth finite field of data, and transforming the fourth finite field of data into a fifth finite field of data represented according to the first encryption standard.

According to some embodiments, each of the first finite field of data, the second finite field of data, the third finite field of data, the fourth finite field of data, the fifth finite field of data, the first finite field of the key value, and the second finite field of the key value is represented in the field $GF(2^8)$. In some embodiments, the first encryption standard is the SM4 cipher. In an embodiment, the second encryption standard is the Advanced Encryption Standard. According to one embodiment, each of the first finite field of data and the second finite field of data includes 16 bytes of plaintext data. In some embodiments, each of the first finite field of the key value and the second finite field of the key value includes 4 bytes of RoundKey.

According to at least one embodiment, each of the first operation and the first modified operation is a substitution operation. In some embodiments, the substitution operation includes a multiplicative inversion function. In an embodiment, the multiplicative inversion function is executed using one or both of AESDECLAST and AESENCLAST. In one embodiment, the first modified operation is an isomorphic version of the first operation. According to an embodiment, each of the first operation and the first modified operation includes a first affine transformation and a second affine transformation. In at least one embodiment, transforming the first operation into the first modified operation includes applying an isomorphic mapping matrix to the first affine transformation and the second affine transformation.

According to an embodiment, each of the second operation and the second modified operation is a permutation operation. In some embodiments, the second modified operation is an isomorphic version of the second operation. In an embodiment, transforming the second operation into the second modified operation includes applying an isomorphic mapping matrix to the second operation. In at least one embodiment, the fifth finite field of data includes 16 bytes of ciphertext data. In some embodiments, the data modification operation is repeatedly executed for a number of rounds specified by the first encryption standard. According to some embodiments, transforming the first finite field of data into the second finite field of data includes transforming a plurality of data points in the first finite field of data into a plurality of data points in the second finite field of data in parallel.

According to at least one embodiment, transforming the first finite field of the key value into the second finite field of the key value includes transforming a plurality of data points in the first finite field of the key value into a plurality of data points in the second finite field of the key value in parallel. In some embodiments, transforming the fourth finite field of data into the fifth finite field of data includes transforming a plurality of data points in the fourth finite field of data into a plurality of data points in the fifth finite field of data in parallel. In one embodiment, executing the second modified operation on the third finite field of data includes executing the second modified operation on a plurality of data points in the third finite field of data in parallel. In some embodiments, executing the first modified operation on the second finite field of data is executed using Advanced Encryption Standard New Instruction Set (AES-NI) in an isolated hardware environment. In at least one embodiment, executing the second modified operation on the third finite field of data is executed using Advanced Encryption Standard New Instruction Set (AES-NI) in an isolated hardware environment.

According to one aspect, a computer system includes at least one processor configured to receive a first finite field of data and a first finite field of a key value each represented according to a first encryption standard, the first encryption standard including a first operation and a second operation, transform the first finite field of data represented by the first encryption standard into a second finite field of data represented according to a second encryption standard, transform the first field of the key value represented by the first encryption standard into a second finite field of a key value represented according to the second encryption standard, transform the first operation into a first modified operation represented according to the second encryption standard, transform the second operation into a second modified operation represented according to the second encryption standard, perform a data modification operation, the data modification operation including acts of executing the first modified operation on the second finite field of data and on the second finite field of key value to generate a third finite field of data and executing the second modified operation on the third finite field of data to generate a fourth finite field of data, and the at least one processor further configured to transform the fourth finite field of data into a fifth finite field of data represented according to the first encryption standard.

In some embodiments, the processor is configured to use the Single Instruction Multiple Data technology to transform the first finite field of data represented by the first encryption standard into the second finite field of data represented according to the second encryption standard, transform the first field of the key value represented by the first encryption standard into the second finite field of the key value represented according to the second encryption standard, transform the fourth finite field of data into a fifth finite field of data represented according to the first encryption standard, and execute the second modified operation on the third finite field of data to generate a fourth finite field of data. In an embodiment, the second modified operation is an isomorphic version of the second operation. In at least one embodiment, transforming the second operation into the second modified operation includes applying an isomorphic mapping matrix to the second operation.

According to some embodiments, the data modification operation is repeatedly executed for a number of rounds specified by the first encryption standard. In some embodiments, each of the first finite field of data, the second finite field of data, the third finite field of data, the fourth finite field of data, the fifth finite field of data, the first finite field of the key value, and the second finite field of the key value is represented in the field $GF(2^8)$. In at least one embodiment, the first encryption standard is the SM4 cipher. In some examples, the second encryption standard is the Advanced Encryption Standard. According to an embodiment, each of the first finite field of data and the second finite field of data includes 16 bytes of plaintext data.

In at least one embodiment, each of the first finite field of the key value and the second finite field of the key value includes 4 bytes of RoundKey. In some embodiments, each of the first operation and the first modified operation is a substitution operation. In an embodiment, the substitution operation includes a multiplicative inversion function. In at least one embodiment, the multiplicative inversion function is executed using one or both of AESDECLAST and AES-ENCLAST. According to an embodiment, the first modified operation is an isomorphic version of the first operation. In some embodiments, each of the first operation and the first modified operation includes a first affine transformation and a second affine transformation.

According to one embodiment, transforming the first operation into the first modified operation includes applying an isomorphic mapping matrix to the first affine transformation and to the second affine transformation. In some examples, each of the second operation and the second modified operation is a permutation operation. In one embodiment, the fifth finite field of data includes 16 bytes of ciphertext data. In an embodiment, executing the first modified operation on the second finite field of data is performed using Advanced Encryption Standard New Instruction Set (AES-NI) in an isolated hardware environment.

In some embodiments, executing the second modified operation on the third finite field of data is performed using Advanced Encryption Standard New Instruction Set (AES-NI) in an isolated hardware environment. In an embodiment, each of the first finite field of data and the second finite field of data includes 16 bytes of ciphertext data. In an embodiment, the fifth finite field of data includes 16 bytes of plaintext data.

According to one aspect, a method of executing a cryptographic cipher is provided, the method including acts of receiving a first finite field of data represented according to a first encryption standard, the first encryption standard including a first operation and a second operation, transforming the first finite field of data represented by the first encryption standard into a second finite field of data represented according to a second encryption standard, transforming the first operation into a first modified operation represented according to the second encryption standard, transforming the second operation into a second modified operation represented according to the second encryption standard, executing the first modified operation and the second modified operation on the second finite field of data to generate a third finite field of data, and transforming the third finite field of data into a fourth finite field of data represented according to the first encryption standard.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Aspects and examples are directed to utilizing the benefits of both the SM4 and the AES ciphers on SM4 input data without introducing excessively-high computation times and complexity. The foregoing may be achieved by computing the isomorphic version of the SM4 permutation operation such that the SM4 permutation operation can be executed directly on AES data, obviating the need to transform the data back to SM4 after every round of the encryption or decryption operation.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

For the sake of clarity, encryption of plaintext input data is used as an example of various cryptographic operations discussed herein. However, it is to be understood that the encryption operations may also be inverted and executed on ciphertext data to perform a decryption operation. Accordingly, the methods and apparatus discussed herein using encryption as an example embodiment may also be applied to decryption.

The AES and SM4 ciphers operate on data represented in Galois fields (i.e., finite fields). As will be appreciated by one of ordinary skill in the art, Galois fields are fields containing a finite number of elements. The number of elements in the finite field is referred to as the field's order, or cardinality, with the critical limitation that the field's order be represented by a prime number raised to an integer power. Stated differently, the order must adhere to the following equation, $$q=p^k \qquad (1)$$

where q is the order, p is a prime number, and k is an integer. In at least one embodiment of the present disclosure, the data for both the AES and SM4 ciphers is represented in a Galois field having a cardinality of 256 elements. For purposes of clarity, the AES Galois field is abbreviated as $GF_{AES}(2^8)$ and the SM4 Galois field is abbreviated as $GF_{SM4}(2^8)$, where the cardinality is expressed in the form of Equation (1) to emphasize that the cardinality adheres to the limitations of Equation (1).

Galois fields having the same order, such as data fields represented according to $GF_{AES}(2^8)$ and $GF_{SM4}(2^8)$, are mathematically isomorphic to one another, which suggests that at least one isomorphic mapping matrix exists to map data from one field to another. The same data can be represented in either $GF_{AES}(2^8)$ or $GF_{SM4}(2^8)$, with the primary difference being that the definitional polynomials of the two fields differ. An isomorphic mapping matrix bridges the gap between the two differing definitional polynomials to transform data from one field to the other. Therefore, if an isomorphic mapping matrix for a pair of isomorphic fields of cardinality 256 is known, the matrix can be applied a byte of data represented according to a first field to produce the byte of data represented according to the second field, and an inverse of the corresponding isomorphic mapping matrix can be applied to the byte of data represented according to the second field to produce the byte of data represented according to the first field. A mathematical relationship can be established according to the following, $$x = M \cdot y \quad (2)$$

$$y = M^{-1} \cdot x \quad (3)$$

where x represents a byte of data in a first field, y represents a byte of data in a second field, M represents an isomorphic mapping matrix that transforms data from the first field to the second field while preserving isomorphism, and $M^1$ represents an inverse isomorphic mapping matrix that transforms data from the second field to the first field while preserving isomorphism. Applying Equations (2) and (3) to a practical example, let x represent a first byte of data represented in $GF_{SM4}(2^8)$ by an 8×1 matrix, and let y represent the corresponding first byte of data represented in $GF_{AES}(2^8)$ by an 8×1 matrix. To convert the byte of data between the two fields, the isomorphic mapping matrix M and the inverse isomorphic mapping matrix $M^1$ are defined in at least one example by, $$M = \begin{bmatrix} 1 & 0 & 0 & 0 & 0 & 1 & 0 & 0 \\ 1 & 1 & 1 & 0 & 0 & 1 & 1 & 0 \\ 1 & 1 & 0 & 1 & 1 & 0 & 1 & 0 \\ 1 & 0 & 1 & 1 & 1 & 1 & 0 & 0 \\ 0 & 0 & 1 & 1 & 0 & 0 & 0 & 0 \\ 1 & 0 & 1 & 1 & 1 & 1 & 1 & 0 \\ 1 & 1 & 1 & 1 & 1 & 1 & 0 & 0 \\ 0 & 0 & 0 & 0 & 1 & 0 & 1 & 1 \end{bmatrix} \quad (4)$$

$$M^{-1} = \begin{bmatrix} 0 & 1 & 1 & 1 & 0 & 0 & 0 & 0 \\ 0 & 0 & 0 & 1 & 0 & 0 & 1 & 0 \\ 1 & 1 & 0 & 0 & 0 & 1 & 1 & 0 \\ 1 & 1 & 0 & 0 & 1 & 1 & 1 & 0 \\ 1 & 0 & 0 & 1 & 1 & 0 & 0 & 0 \\ 1 & 1 & 1 & 1 & 0 & 0 & 0 & 0 \\ 0 & 0 & 0 & 1 & 0 & 1 & 0 & 0 \\ 1 & 0 & 0 & 0 & 1 & 1 & 0 & 1 \end{bmatrix} \quad (5)$$

In summary, it is possible to convert a byte of data from one field to another by executing one of the isomorphic matrix-vector multiplication operations described above by Equations (2) and (3). As discussed above with respect to FIG. 1, this property is utilized at acts 106 and 110 to transform data between AES and SM4. However, it will be appreciated by one of ordinary skill in the art that matrix-vector multiplication is not a computationally-negligible operation and, as discussed above, it would be advantageous to reduce the number of matrix-vector multiplication operations executed.

At least one embodiment of the present disclosure addresses the foregoing deficiencies by taking advantage of another property of isomorphic fields. Just as data may be transformed from one field to another while preserving isomorphism, operations may be transformed from one field to another by applying an isomorphic mapping matrix to the operation while preserving isomorphism. For example, let $D_{SM4}$ represent an operation (e.g., a substitution operation and a permutation operation, which can be constructed from basic field computations, including addition and multiplication, modulo the SM4 field definitional polynomial) defined in $GF_{SM4}(2^8)$ that is executed on a pair of bytes f and g defined in $GF_{SM4}(2^8)$. The resulting operation can be mathematically defined as, $$h = f \cdot D_{SM4} \cdot g \quad (6)$$

where h represents the output data defined in $GF_{SM4}(2^8)$. Suppose, however, that a pair of bytes u and v defined in $GF_{AES}(2^8)$ exist, and that it is desirable to apply the operation $D_{SM4}$ to the bytes u and v. Because the bytes are defined in $GF_{AES}(2^8)$, and the operation $D_{SM4}$ is defined in $GF_{SM4}(2^8)$, it is not possible to apply $D_{SM4}$ directly to u and v. However, it is possible to transform the operation $D_{SM4}$ such that it is defined in $GF_{AES}(2^8)$ using the equation, $$D_{AES} = M \cdot D_{SM4} \cdot M^{-1} \quad (7)$$

where $D_{AES}$ is the isomorphic version of the operation $D_{SM4}$. $D_{AES}$ is defined in $GF_{AES}(2^8)$ and may be applied to the bytes u and v, which are also defined in $GF_{AES}(2^8)$. Accordingly, to execute the operation $D_{SM4}$ on bytes u and v, the bytes u and v can be transformed to $GF_{SM4}(2^8)$ such that $D_{SM4}$ may be applied to the transformed bytes, or one may transform $D_{SM4}$ using Equation (7) such that $D_{AES}$ may be applied directly to the bytes u and v. The latter approach offers significant advantages, as discussed below.

Figure 2:
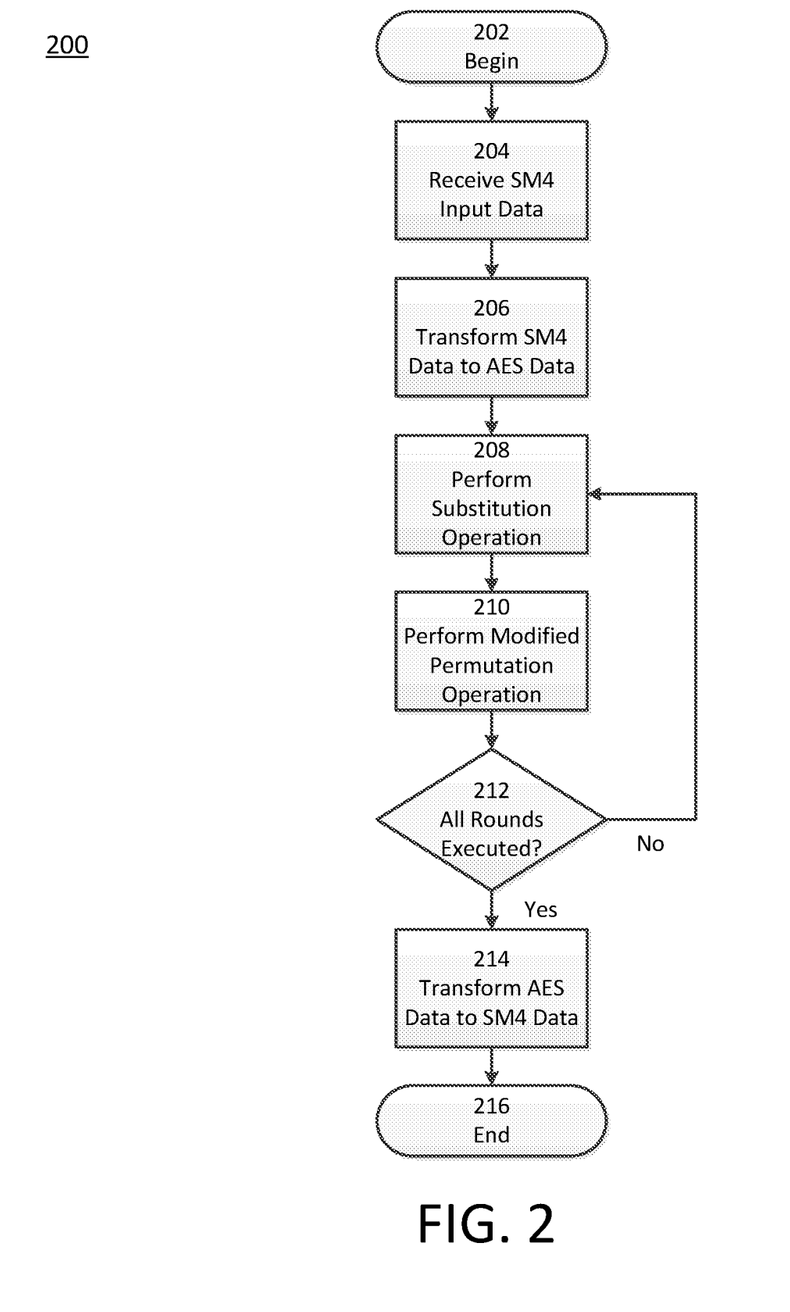
FIG. 2 is a process of executing a cryptographic cipher according to one embodiment.

FIG. 2 illustrates a process 200 of encrypting an SM4 input data block using the AES and SM4 ciphers with low computational complexity according to an embodiment. The process 200 may be executed by a system executing the encryption operation and includes acts of receiving SM4 input data, transforming the SM4 data into AES data, performing a modified substitution operation, performing a modified permutation operation, repeatedly iterating acts of the process until a specified number of rounds have been executed, and transforming the AES data to SM4 data.

At act 202, the process 200 begins. At act 204, an input data set defined in $GF_{SM4}(2^8)$ is received. At act 206, the input data set defined in $GF_{SM4}(2^8)$ is transformed into data defined in $GF_{AES}(2^8)$ by applying Equation (2) to the input data set. At act 208, the AES substitution operation, Sub-Bytes, is executed on the data defined in $GF_{AES}(2^8)$. At act 210, the SM4 permutation operation, LBox, is transformed into $GF_{AES}(2^8)$ using Equation (7) and the transformed operation is applied to the data defined in $GF_{AES}(2^8)$.

At act 212, a decision is made as to whether all of the encryption rounds have been executed. If not, the process 200 returns to act 208. Otherwise, the process 200 continues to act 214. At act 214, the data defined in $GF_{AES}(2^8)$ is transformed back into data defined in $GF_{SM4}(2^8)$ by applying Equation (3) to the data. At act 216, the process 200 ends.

Execution of the process 200 significantly reduces the amount of time and resources necessary to encrypt or decrypt information, at least because the data set is not transformed twice per round of encryption or decryption. Rather, the data set is transformed a total of two times for the entire encryption operation, regardless of the number of rounds over which the data is encrypted. For example, and as discussed above, encrypting 16 bytes of $GF_{SM4}(2^8)$ data using the process 100 over 32 rounds requires 256 matrix-vector multiplication operations executed solely to transform the data set. By contrast, encrypting 16 bytes of $GF_{SM4}(2^8)$ data over 32 rounds using the process 200 requires only 32 matrix-vector multiplication operations to transform the data set, which reduces the number of matrix-vector multiplication operations by 224.

Reducing the amount of time and resources spent on executing matrix-vector multiplication operations significantly enhances the security and performance of the computer system in which the process 200 is executed. For example, execution time can be reduced by 12% Central Processing Unit (CPU) cycles per byte relative to the prior art in one embodiment, 37% CPU cycles per byte in another embodiment, and 49% CPU cycles per byte in yet another embodiment. Furthermore, embodiments discussed herein offer additional encryption security to systems that lack the resources to execute the computationally-burdensome approach contemplated by the prior art.

The modified substitution operation discussed above with respect to act 208 will now be described in greater detail. As discussed above, executing the substitution operation using the AES-NI instructions offers significant improvements to encryption security. Executing the modified substitution operation at act 208 on $GF_{SM4}(2^8)$ data received at act 204 requires a discussion of the substitution operation defined over $GF_{SM4}(2^8)$ and the substitution operation defined over $GF_{AES}(2^8)$.

The transformation of the substitution operation defined over $GF_{SM4}(2^8)$, SBox, into a substitution operation that can be executed with the AES-NI instruction set will now be described in greater detail. As discussed above, the SBox operation can be executed by accessing a lookup table, where each input byte has a corresponding output byte mapped thereto. Table 1, below, illustrates the SBox lookup table.

byte is then substituted with the output byte at the intersection of the addressed row and column.

For example, for the input "00101100", the first half of the byte is "0010", which is equivalent to the hexadecimal value "2", and the second half of the byte is "1100", which is equivalent to the hexadecimal value "c". Addressing row "2" and column "c" yields an output hexadecimal value "ed".

Although the SBox operation can be represented and executed as a lookup table, the SBox operation can also be represented mathematically as, $$\text{SBox}(x) = I(x \cdot A + C) \cdot A + C \tag{8}$$

where x is the input byte, A and C are matrices defined below, and I is a multiplicative inverse function over $GF_{SM4}(2^8)$. Stated differently, the function I can be expressed as, $$I(x) \cdot x = 1 \% p(x) \tag{9}$$

where x is the input, % represents the modulo function, and p(x) is the following irreducible polynomial over GF(2), $$p(x) = x^8 + x^7 + x^6 + x^5 + x^4 + x^2 + 1 \tag{10}$$

The matrices A and C are defined as follows, $$A = \begin{bmatrix} 1 & 1 & 1 & 0 & 0 & 1 & 0 & 1 \\ 1 & 1 & 1 & 1 & 0 & 0 & 1 & 0 \\ 0 & 1 & 1 & 1 & 1 & 0 & 0 & 1 \\ 1 & 0 & 1 & 1 & 1 & 1 & 0 & 0 \\ 0 & 1 & 0 & 1 & 1 & 1 & 1 & 0 \\ 0 & 0 & 1 & 0 & 1 & 1 & 1 & 1 \\ 1 & 0 & 0 & 1 & 0 & 1 & 1 & 1 \\ 1 & 1 & 0 & 0 & 1 & 0 & 1 & 1 \end{bmatrix} \tag{11}$$

$$C = \begin{bmatrix} 1 & 1 & 0 & 0 & 1 & 0 & 1 & 1 \end{bmatrix} \tag{12}$$

The SBox operation is designed to receive a horizontally-structured input byte (i.e., an input byte structured according to a 1×8 matrix), as is expected of an operation defined over $GF_{SM4}(2^8)$. Executing the operation using AES-NI instructions, however, requires a vertically-structured input byte (i.e., an input byte structured according to an 8×1 matrix).

TABLE 1

| | 0 | 1 | 2 | 3 | 4 | 5 | 6 | 7 | 8 | 9 | a | b | c | d | e | f |
|---|---|---|---|---|---|---|---|---|---|---|---|---|---|---|---|---|
| 0 | d6 | 90 | e9 | fe | cc | e1 | 3d | b7 | 16 | b6 | 14 | c2 | 28 | fb | 2c | 05 |
| 1 | 2b | 67 | 9a | 76 | 2a | be | 04 | c3 | aa | 44 | 13 | 26 | 49 | 86 | 06 | 99 |
| 2 | 9c | 42 | 50 | f4 | 91 | ef | 98 | 7a | 33 | 54 | 0b | 43 | ed | cf | ac | 62 |
| 3 | e4 | b3 | 1c | a9 | c9 | 08 | e8 | 95 | 80 | df | 94 | fa | 75 | 8f | 3f | a6 |
| 4 | 47 | 07 | a7 | fc | f3 | 73 | 17 | ba | 83 | 59 | 3c | 19 | e6 | 85 | 4f | a8 |
| 5 | 68 | 6b | 81 | b2 | 71 | 64 | da | 8b | f8 | eb | 0f | 4b | 70 | 56 | 9d | 35 |
| 6 | 1e | 24 | 0e | 5e | 63 | 58 | d1 | a2 | 25 | 22 | 7c | 3b | 01 | 21 | 78 | 87 |
| 7 | d4 | 00 | 46 | 57 | 9f | d3 | 27 | 52 | 4c | 36 | 02 | e7 | a0 | c4 | c8 | 9e |
| 8 | ea | bf | 8a | d2 | 40 | c7 | 38 | b5 | a3 | f7 | f2 | ce | f9 | 61 | 15 | a1 |
| 9 | e0 | ae | 5d | a4 | 9b | 34 | 1a | 55 | ad | 93 | 32 | 30 | f5 | 8c | b1 | e3 |
| a | 1d | f6 | e2 | 2e | 82 | 66 | ca | 60 | c0 | 29 | 23 | ab | 0d | 53 | 4e | 6f |
| b | d5 | db | 37 | 45 | de | fd | 8e | 2f | 03 | ff | 6a | 72 | 6d | 6c | 5b | 51 |
| c | 8d | 1b | af | 92 | bb | dd | bc | 7f | 11 | d9 | 5c | 41 | 1f | 10 | 5a | d8 |
| d | 0a | c1 | 31 | 88 | a5 | cd | 7b | bd | 2d | 74 | d0 | 12 | b8 | e5 | b4 | b0 |
| e | 89 | 69 | 97 | 4a | 0c | 96 | 77 | 7e | 65 | b9 | f1 | 09 | c5 | 6e | c6 | 84 |
| f | 18 | f0 | 7d | ec | 3a | dc | 4d | 20 | 79 | ee | 5f | 3e | d7 | cb | 39 | 48 |

To substitute an input byte of binary data, the first four bits of the input byte are separated from the last four bits of the input byte. The first four bits are used to address a row, and the second four bits are used to address a column. The input Modifying the SBox operation to receive a vertically-structured input byte yields the following equation, $$\text{SBox}(x) = A_2 \cdot I(A_1 \cdot x + C_1) + C_2 \tag{13}$$

where x is the input, I is the multiplicative inverse function over $GF_{SM4}(2^8)$, and the matrices $A_1$, $A_2$, $C_1$, and $C_2$ are defined as follows, $$A_1 = \begin{bmatrix} 1 & 0 & 1 & 0 & 0 & 1 & 1 & 1 \\ 0 & 1 & 0 & 0 & 1 & 1 & 1 & 1 \\ 1 & 0 & 0 & 1 & 1 & 1 & 1 & 0 \\ 0 & 0 & 1 & 1 & 1 & 1 & 0 & 1 \\ 0 & 1 & 1 & 1 & 1 & 0 & 1 & 0 \\ 1 & 1 & 1 & 1 & 0 & 1 & 0 & 0 \\ 1 & 1 & 1 & 0 & 1 & 0 & 0 & 1 \\ 1 & 1 & 0 & 1 & 0 & 0 & 1 & 1 \end{bmatrix} \quad (14)$$

$$A_2 = \begin{bmatrix} 1 & 1 & 0 & 0 & 1 & 0 & 1 & 1 \\ 1 & 0 & 0 & 1 & 0 & 1 & 1 & 1 \\ 0 & 0 & 1 & 0 & 1 & 1 & 1 & 1 \\ 0 & 1 & 0 & 1 & 1 & 1 & 1 & 0 \\ 1 & 0 & 1 & 1 & 1 & 1 & 0 & 0 \\ 0 & 1 & 1 & 1 & 1 & 0 & 0 & 1 \\ 1 & 1 & 1 & 1 & 0 & 0 & 1 & 0 \\ 1 & 1 & 1 & 0 & 0 & 1 & 0 & 1 \end{bmatrix} \quad (15)$$

$$C_1 = \begin{bmatrix} 1 \\ 1 \\ 0 \\ 0 \\ 1 \\ 0 \\ 1 \\ 1 \end{bmatrix} \quad (16)$$

$$C_2 = \begin{bmatrix} 1 \\ 1 \\ 0 \\ 1 \\ 0 \\ 0 \\ 1 \\ 1 \end{bmatrix} \quad (17)$$

Generally speaking, the argument of the multiplicative inverse function I of Equation (13), $A_1 \cdot x + C_1$, is referred to as a first affine transformation, and $A_2 \cdot x' + C_2$ is referred to as a second affine transformation, where x' represents the output of the multiplicative inverse function I executed on the first affine transformation. An input word received at act 204, consisting of 32 bits, is segmented into four bytes represented as $(x_0, x_1, x_2, x_3)$, and Equation (13) is applied to the four bytes in parallel to the entire input word to produce a substituted output word. Mathematically, this operation is defined as, $$S(x)=(SBox(x_0), SBox(x_1), SBox(x_2), SBox(x_3)) \quad (18)$$

As discussed above, executing the multiplicative inversion function of the first affine transformation discussed above with respect to Equation (13) is not secure in SM4. Accordingly, the inversion of the first affine transformation is performed using the AES-NI instructions, which includes the AESDECLAST and AESENCLAST instructions, either of which can be used to perform the inversion operation. In the following examples, AESDECLAST is utilized by the AES substitution function, SubBytes, by way of example for educational purposes. The SubBytes operation, the AESDECLAST inversion function, and the transformations necessary to execute the SBox operation using AESDECLAST, will now be described in greater detail.

The SubBytes operation is defined by the following, $$y = SubBytes(A \cdot x^{-1} + B) \quad (19)$$

where y is an output byte, the matrices A and B are defined below, and $x^{-1}$ is the multiplicative inversion function computed using AESDECLAST. The multiplication inversion, $x^{-1}$, is computed modulo the following irreducible polynomial over GF(2), $$q(x) = x^8 + x^4 + x^3 + x + 1 \quad (20)$$

with the special definition $0^{-1} = 0$. The matrices A and B are defined as, $$A = \begin{bmatrix} 1 & 0 & 0 & 0 & 1 & 1 & 1 & 1 \\ 1 & 1 & 0 & 0 & 0 & 1 & 1 & 1 \\ 1 & 1 & 1 & 0 & 0 & 0 & 1 & 1 \\ 1 & 1 & 1 & 1 & 0 & 0 & 0 & 1 \\ 1 & 1 & 1 & 1 & 1 & 0 & 0 & 0 \\ 0 & 1 & 1 & 1 & 1 & 1 & 0 & 0 \\ 0 & 0 & 1 & 1 & 1 & 1 & 1 & 0 \\ 0 & 0 & 0 & 1 & 1 & 1 & 1 & 1 \end{bmatrix} \quad (21)$$

$$B = \begin{bmatrix} 1 \\ 1 \\ 0 \\ 0 \\ 0 \\ 1 \\ 1 \\ 0 \end{bmatrix} \quad (22)$$

Calculating $x^{-1}$ in the SubBytes operation is performed by providing the input x as the argument to the AESDECLAST function. The AESDECLAST operation is defined as follows, $$x^{-1} = AESDECLAST(x) = (A^{-1} \cdot x + A^{-1} \cdot B)^{-1} \quad (23)$$

where $A^{-1}$ is the invert matrix of A defined in Equation (21), B is the matrix described in Equation (22), and x is an input byte defined over $GF_{AES}(2^8)$. The output of the AESDECLAST function is computed modulo the irreducible polynomial q(x) described in Equation (20). However, the first affine transformation, $A_1 \cdot x + C_1$, cannot be directly inserted into Equation (23) to undergo multiplicative inversion because the AESDECLAST inversion operation is configured to receive an input defined over $GF_{AES}(2^8)$ and the first affine transformation is defined over $GF_{SM4}(2^8)$. Accordingly, the first affine transformation must be transformed into $GF_{AES}(2^8)$ using Equations (2) and (7) as follows, $$x = (M \cdot A_1 \cdot M^{-1}) \cdot y + M \cdot C_1 \quad (24)$$

where x is the input to the AESDECLAST operation defined in Equation (23), y is a $GF_{AES}(2^8)$ input byte received at act 206, and $A_1$ and $C_1$ are matrices defined in Equations (14) and (16), respectively. Substituting Equation (24) into Equation (23) yields the following input operation, $$AESDECLAST(x) = AESDECLAST(A \cdot (M \cdot A_1 \cdot M^{-1}) \cdot y + A \cdot M \cdot C_1 + B) \quad (25)$$

where the output of Equation (25) is the input to the second affine transformation, which is defined as $A_2 x + C_2$, as discussed above.

Similar to the first affine transformation, however, the second affine transformation must be transformed to a $GF_{AES}(2^8)$ operation. The second affine transformation is mapped to $GF_{AES}(2^8)$ using Equations (2) and (7) to yield the following, $$z=(M \cdot A_2 \cdot M^{-1}) \cdot x + M \cdot C_2 \qquad (26)$$

where x is the output of Equation (25) and z is the output of Equation (26) defined in $GF_{AES}(2^8)$. Substituting Equation (25) into Equation (26) yields the following, $$z=(M \cdot A_2 \cdot M^{-1}) \cdot \text{AESDECLAST}(A \cdot (M \cdot A_1 \cdot M^{-1}) \cdot y + A \cdot M \cdot C_1 + B) + M \cdot C_2 \qquad (27)$$

where z is the output byte of the substitution operation defined over $GF_{AES}(2^8)$, and y is the input byte defined over $GF_{AES}(2^8)$. Accordingly, z represents the output of the modified substitution operation performed at act 208 for one round of encryption.

When the AESDECLAST operation is executed, the operation is configured to accept two values as an input—a state byte and a round key—and the output of the AESDECLAST operation is the sum of the inverse of the state byte plus the round key. The input values to AESDECLAST are defined as follows, $$\text{State\_Byte}=A \cdot (M \cdot A_1 \cdot M^{-1}) \cdot y + A \cdot M \cdot C_1 + B \qquad (28)$$

$$\text{Round\_Key}=M \cdot A_2^{-1} \cdot C_2 \qquad (29)$$

Combining the foregoing, the AES-NI instruction formulation can be represented as, $$(M \cdot A_2 \cdot M^{-1}) \cdot \text{AESDECLAST}(A \cdot (M \cdot A_1 \cdot M^{-1}) \cdot y + A \cdot M \cdot C_1 + B, M \cdot A_2^{-1} \cdot C_2) \qquad (30)$$

which can, in turn, be simplified to the following, $$(M \cdot A_2 \cdot M^{-1}) \cdot \text{AESDECLAST}(\text{State\_Byte}, \text{Round\_Key}) \qquad (31)$$

The four bytes of output data produced at act 208, each of which is calculated using Equation (27), next undergo a modified permutation operation at act 210 which will now be described in greater detail. The SM4 permutation operation, LBox, is a linear permutation operation that is executed on 32 bits of data, hereinafter referred to as a "word," segmented into four bytes. The definition of the SM4 permutation operation is as follows, $$\begin{pmatrix} z_0 \\ z_1 \\ z_2 \\ z_3 \end{pmatrix} = LBox \begin{pmatrix} x_0 \\ x_1 \\ x_2 \\ x_3 \end{pmatrix} = \begin{pmatrix} L_{00} & L_{01} & L_{02} & L_{03} \\ L_{10} & L_{11} & L_{12} & L_{13} \\ L_{20} & L_{21} & L_{22} & L_{23} \\ L_{30} & L_{31} & L_{32} & L_{33} \end{pmatrix} \begin{pmatrix} x_0 \\ x_1 \\ x_2 \\ x_3 \end{pmatrix} \qquad (32)$$

where $(z_0, z_1, z_2, z_3)$ is the output, $(x_0, x_1, x_2, x_3)$ is the input, and each $L_{ij}$ is an 8×8 binary matrix. The multiplication of the matrices above can be broken into a plurality of matrix-vector sub-calculations for each pair of elements as follows, $$L_{i,j} x_j \qquad (33)$$

where $L_{i,j}$ is a respective binary matrix and $x_j$ is a respective SM4 input, defined over i,j=0, 1, 2, 3. The isomorphic version of Equation (33) is as follows, $$M \cdot L_{ij} \cdot M^{-1} \cdot y_j \qquad (34)$$

where $L_{i,j}$ is a respective binary matrix, and $y_j$ is a respective SM4 input mapped to $GF_{AES}(2^8)$. The complete $GF_{AES}(2^8)$ field isomorphic version of the SM4 LBox operation can therefore be represented by, $$\begin{pmatrix} z_0 \\ z_1 \\ z_2 \\ z_3 \end{pmatrix} = \begin{pmatrix} M & 0 & 0 & 0 \\ 0 & M & 0 & 0 \\ 0 & 0 & M & 0 \\ 0 & 0 & 0 & M \end{pmatrix} \qquad (35)$$

$$\begin{pmatrix} L_{00} & L_{01} & L_{02} & L_{03} \\ L_{10} & L_{11} & L_{12} & L_{13} \\ L_{20} & L_{21} & L_{22} & L_{23} \\ L_{30} & L_{31} & L_{32} & L_{33} \end{pmatrix} \begin{pmatrix} M^{-1} & 0 & 0 & 0 \\ 0 & M^{-1} & 0 & 0 \\ 0 & 0 & M^{-1} & 0 \\ 0 & 0 & 0 & M^{-1} \end{pmatrix} \begin{pmatrix} y_0 \\ y_1 \\ y_2 \\ y_3 \end{pmatrix}$$

Equation (35) can be further simplified to the following, $$L_{GF-AES} \cdot Y = \qquad (36)$$

$$\begin{pmatrix} M \cdot L_{00} \cdot M^{-1} & M \cdot L_{01} \cdot M^{-1} & M \cdot L_{02} \cdot M^{-1} & M \cdot L_{03} \cdot M^{-1} \\ M \cdot L_{10} \cdot M^{-1} & M \cdot L_{11} \cdot M^{-1} & M \cdot L_{12} \cdot M^{-1} & M \cdot L_{13} \cdot M^{-1} \\ M \cdot L_{20} \cdot M^{-1} & M \cdot L_{21} \cdot M^{-1} & M \cdot L_{22} \cdot M^{-1} & M \cdot L_{23} \cdot M^{-1} \\ M \cdot L_{30} \cdot M^{-1} & M \cdot L_{31} \cdot M^{-1} & M \cdot L_{32} \cdot M^{-1} & M \cdot L_{33} \cdot M^{-1} \end{pmatrix} \cdot$$

$$\begin{pmatrix} y_0 \\ y_1 \\ y_2 \\ y_3 \end{pmatrix}$$

As discussed above, the permutation operation serves a data diffusion role. Specifically, the permutation operation executes a circular shift operation on the round function and the key schedule function, which will be described in greater detail below. The permutation operation for the round function, LBox, and for the key schedule function, LBox', are defined as, $$LBox(x) = \oplus (x \lll 2) \oplus (x \lll 10) \oplus (x \lll 18) \oplus (x \lll 24) \qquad (37)$$

$$LBox'(x) = x \oplus (x \lll 13) \oplus (x \lll 23) \qquad (38)$$

where x is a 32-bit input vector, $\oplus$ represents a bitwise XOR function, and $x \lll n$ represents a circular shift operation of the bits of the vector x by n positions to the left, with the most significant bits wrapping around to the least significant bit positions. Accordingly, the permuted data is "diffused" by repeatedly mixing the data points.

The key schedule function and the round function will now be described in greater detail. The key schedule function computes a round key for each encryption round using a secret key value as an input. For example, for a function executing 32 rounds of encryption, the input key value and the input vector to the key schedule function is defined by, $$Y = (Y_i, Y_{i+1}, Y_{i+2}, Y_{i+3}) \in (Z_2^{32})^4 \text{ for } i = 0, 1, \ldots, 31 \qquad (39)$$

$$K = (K_0, K_1, K_2, K_3) \qquad (40)$$

where Y is the input vector to the key schedule function and K is the 32-bit input key value, which is segmented into four constituent bytes. The first four elements of the input vector Y are defined as $$Y_0 = K_0 \oplus 0xa3b1bac6 \qquad (41)$$

$$Y_1 = K_1 \oplus 0x56aa3350 \qquad (42)$$

$$Y_2 = K_2 \oplus 0x677d9197 \qquad (43)$$

$$Y_3 = K_3 \oplus 0xb27022dc \qquad (44)$$

Combining the foregoing parameters, the round key for each round i is defined by the key schedule function as, $$RK_i=Y_{i+4}=Y_i \oplus \text{LBox}'(\text{SBox}(Y_{i+1} \oplus Y_{i+2} \oplus Y_{i+3} \oplus CK_i)) \quad (45)$$

where i=(0, 1, . . . 31) and $CK_i$ is defined by, $$CK_i=(ck_{i,0},ck_{i,1},ck_{i,2},ck_{i3})) \in (Z_2^8)^4 \quad (46)$$

and $$ck_{i,j}=(28i+7j)\%256 \quad (47)$$

The round key $RK_i$ calculated in Equation (45) is used to encrypt a plaintext input vector X, defined by the following, $$X=(X_i,X_{i+2},X_{i+2},X_{i+3}) \in (Z_2^{32})^4 \quad (48)$$

$$X_{i+4}=X_i \oplus \text{LBox}(\text{SBox}(X_{i+1} \oplus X_{i+2} \oplus X_{i+3} \oplus RK_i)) \quad (49)$$

The order of the last four bytes output by Equation (49) (i.e., the output from rounds i=32, 33, 34, and 35) is reversed to generate the ciphertext output. Stated differently, the order of the last four bytes is ($X_{35}$, $X_{34}$, $X_{33}$, $X_{32}$)

The foregoing equations will now be combined to execute a respective encryption round. To summarize the above, Equation (30) represents the substitution operation defined in $GF_{AES}(2^8)$, Equation (36) represents the permutation operation defined in $GF_{AES}(2^8)$, Equation (45) represents the key schedule function, and Equation (49) represents the round function. Substituting Equation (30) into Equation (36) yields the following, $$u=(M \cdot L_{i,j} \cdot M^{-1}) \cdot (M \cdot A_2 \cdot M^{-1}) \cdot \text{AESDECLAST}(A \cdot (M \cdot A_1 \cdot M^{-1}) \cdot y + A \cdot M \cdot C_1 + B, M \cdot A_2^{-1} \cdot C_2) \quad (50)$$

where u is the output of one round of encryption at act 210 of the process 200. If it is determined at act 212 that more rounds need to be executed, the process returned to act 208. To prepare for the first affine transformation in the next round of encryption, Equation (50) is multiplied by $A \cdot (M \cdot A_1 \cdot M^{-1})$ to yield the following, $$v=A \cdot (M \cdot A_1 \cdot M^{-1}) \cdot (M \cdot L_{i,j} \cdot M^{-1}) \cdot (M \cdot A_2 \cdot M^{-1}) \cdot \text{AESDECLAST}(A \cdot (M \cdot A_1 \cdot M^{-1}) \cdot y + A \cdot M \cdot C_1 + B, M \cdot A_2^{-1} \cdot C_2) \quad (51)$$

where v is the output of the subsequent round.

To further improve computational efficiency, the multiplication of the matrices preceding the AESDECLAST operation, $A \cdot (M \cdot A_1 \cdot M^{-1}) \cdot (M \cdot L_{i,j} \cdot M^{-1}) \cdot (M \cdot A_2 \cdot M^{-1})$, can be combined into a single table lookup operation. Although executing the table lookup operation with the SBox operation introduces security concerns for the reasons discussed above, executing the table lookup operation does not affect the security of the encryption operation because the LBox operation does not include key information. Even if a malicious process were to observe the LBox table lookup operation, no key information could be obtained therefrom.

An example execution of the process 200 will now be described using the equations described above to encrypt 16 bytes of $GF_{SM4}(2^8)$ data over 32 rounds. At act 202, the process 200 begins. At act 204, input data defined over $GF_{SM4}(2^8)$ is received. For example, in the case of encryption, the input data may be 16 bytes of plaintext data defined over $GF_{SM4}(2^8)$, represented as ($x_0$, $x_1$ . . . $x_{15}$). At act 206, the input data defined over $GF_{SM4}(2^8)$ is transformed into input data defined over $GF_{AES}(2^8)$ using the following, $$y_{i,j}=A \cdot (M \cdot A_1 \cdot M^{-1}) \cdot M \cdot x_{i \text{ dev } 4, i \text{ mod } 4} \quad (52)$$

where i=0, 1, . . . 15. The bytes of data output from Equation (52) are consolidated into four 4×1 matrices represented by, $$Y_i = \begin{bmatrix} y_{i,0} \\ y_{i,1} \\ y_{i,2} \\ y_{i,3} \end{bmatrix} \quad (53)$$

where i=0, 1, 2, 3.

At act 208, for each round indicated by r=0, 1, . . . 31, the input to Equation (31) is defined as, $$\text{State} = Y_{r+1} + Y_{r+2} + Y_{r+3} + \begin{bmatrix} Q & 0 & 0 & 0 \\ 0 & Q & 0 & 0 \\ 0 & 0 & Q & 0 \\ 0 & 0 & 0 & Q \end{bmatrix} \quad (54)$$

$$Q = A \cdot (M \cdot A_1 \cdot M^{-1}) \cdot RK_r + A \cdot M \cdot C_1 + B \quad (55)$$

where $RK_r$ is the round key for a corresponding round r and 0 is an 8×8 zero matrix. The substitution operation is executed as follows, $$\text{State\_NI}=\text{AESDECLAST}(\text{State}, M \cdot A_2^{-1} \cdot C_2) \quad (56)$$

where State_NI is the output of the substitution operation. The permutation operation is next executed as follows, $$Y_{r+4} = Y_r + \begin{bmatrix} R & 0 & 0 & 0 \\ 0 & R & 0 & 0 \\ 0 & 0 & R & 0 \\ 0 & 0 & 0 & R \end{bmatrix} \cdot \begin{bmatrix} (M \cdot L_{i,j} \cdot M^{-1}) \\ (M \cdot L_{i,j} \cdot M^{-1}) \\ (M \cdot L_{i,j} \cdot M^{-1}) \\ (M \cdot L_{i,j} \cdot M^{-1}) \end{bmatrix} \cdot \begin{bmatrix} (M \cdot A_2 \cdot M^{-1}) \\ (M \cdot A_2 \cdot M^{-1}) \\ (M \cdot A_2 \cdot M^{-1}) \\ (M \cdot A_2 \cdot M^{-1}) \end{bmatrix} \cdot \text{State\_NI} \quad (57)$$

$$R = A \cdot (M \cdot A_1 \cdot M^{-1}) \quad (58)$$

where 0 denotes an 8×8 zero matrix. It is to be appreciated that the matrices in Equation (57) are written in expanded, segmented form for purposes of clarity only. In operation, the multiplication of the matrices is precomputed into a single matrix used to execute a single table lookup on the input value, State_NI.

If more rounds are to be executed, the process 200 returns to act 208. Otherwise, after 32 rounds of encryption, act 212 continues to act 214. At act 214, the 16 bytes of output ciphertext $Y_{35}$, $Y_{34}$, $Y_{33}$, $Y_{32}$ are converted back to $GF_{SM4}(2^8)$ by applying the following matrix to the output ciphertext, $$[A \cdot (M \cdot A_1 \cdot M^{-1}) \cdot M]^{-1} \quad (59)$$

After executing Equation (59), the process 200 ends at act 216.

Figure 3:
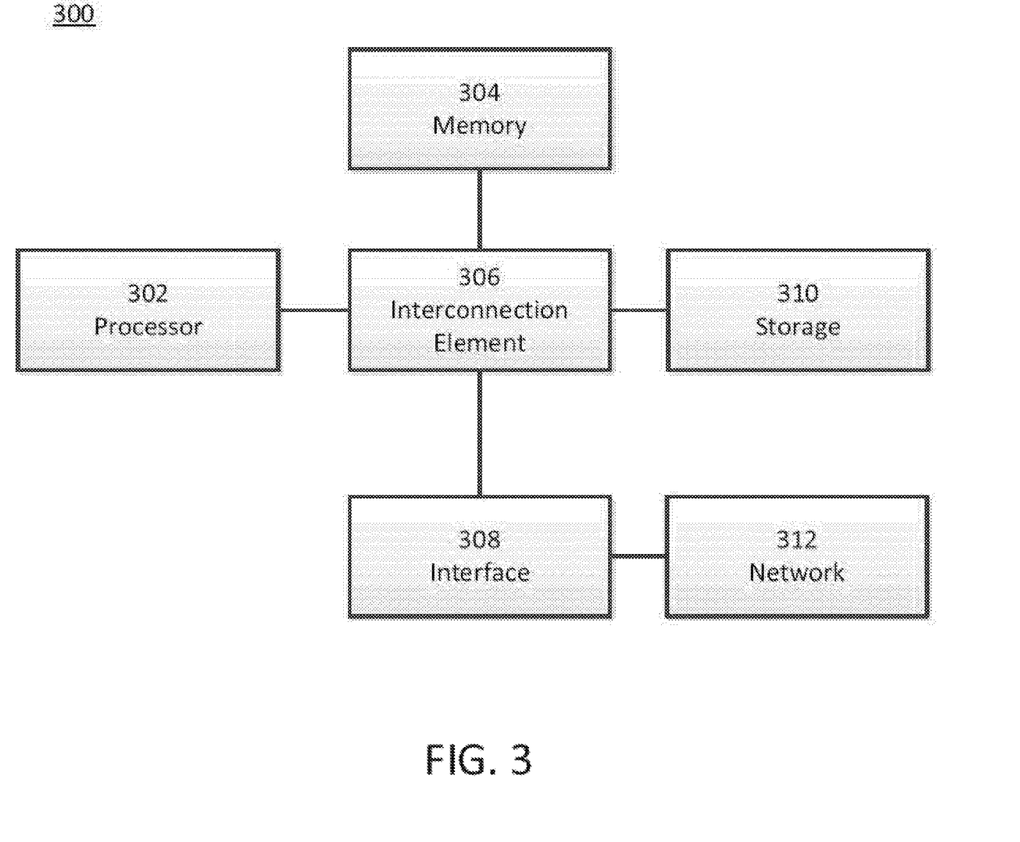
FIG. 3 is a block diagram of a computer system.

As discussed above, the process 200 provides significant improvements to computational efficiency and simplicity in computer systems executing encryption operations. For example, FIG. 3 illustrates a computer system 300 in which the process 200 can be implemented to improve the operation of the computer system 300. The computer system 300 includes a processor 302, one or more memory elements 304, an interconnection element 306, one or more interface devices 308 coupled to a communication network 312, and a data storage element 310. As shown, the computer system 300 is connected to, and may exchange data through, the communication network 312. The communication network 312 may include any communication network through which computer systems may exchange data. To exchange data using the communication network 312, the computer system 300 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer system 300 may transmit data via the communication network 312 using a variety of security measures described herein.

To implement at least some of the aspects, functions and processes disclosed herein, the processor 302 performs a series of instructions that result in manipulated data. The processor 302 may be any type of processor, multiprocessor or controller. Some example processors include commercially available processors such as an Intel Atom, Itanium, Core, Celeron, or Pentium processor, an AMD Opteron processor, an Apple A4 or A5 processor, a Sun UltraSPARC or IBM Power5+ processor and an IBM mainframe chip. The processor 302 is connected to other system components, including the one or more memory elements 304, by the interconnection element 306. In certain embodiments, the processor 302 may include multiple processing units capable of executing the Single Instruction Multiple Data (SIMD) parallel computing technology. SIMD enables multiple processing units to perform the same operation on multiple data points simultaneously, or in parallel, significantly reducing computation time.

As discussed in greater detail below, embodiments disclosed herein can effectively be processed in parallel using the SIMD technology. Conversely, the prior art requires sequential transformations of round data between a first and a second field, sandwiched between substitution in the first field and permutation in the second field for each round, substantially diminishing the effectiveness of parallel processing. Specifically, the sequential nature of the prior art renders the system unable to use 512-bit register technology, including INTEL's AVX512 technology to be released in 2017, INTEL's AVX1024 technology to be released in the near future, POWERPC's AltiVec technology, SUN's VIS technology, AMD's 3DNow! technology, and so forth.

The one or more memory elements 304 store programs and data during operation of the computer system 300. Thus, the one or more memory elements 304 may be relatively high performance, volatile, random access memory such as dynamic random access memory ("DRAM") or static memory ("SRAM"). However, the one or more memory elements 304 may include any device for storing data, such as a disk drive or other nonvolatile storage device. Various examples may organize the one or more memory elements 304 into particularized and, in some cases, unique structures to perform the functions disclosed herein. These data structures may be sized and organized to store values for particular data and types of data.

Components of the computer system 300 are coupled by an interconnection element such as the interconnection element 306. The interconnection element 306 may include one or more physical busses, for example, busses between components that are integrated within a same machine, but may include any communication coupling between system elements including specialized or standard computing bus technologies such as IDE, SCSI, PCI and InfiniBand. The interconnection element 306 enables communications, such as data and instructions, to be exchanged between system components of the computer system 300.

The computer system 300 also includes the one or more interface devices 308 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, and so forth. Interface devices allow the computer system 300 to exchange information and to communicate with external entities, such as users and other systems.

The data storage element 310 includes a computer readable and writeable nonvolatile, or non-transitory, data storage medium in which instructions are stored that define a program or other object that is executed by the processor 302. The data storage element 310 also may include information that is recorded, on or in, the medium, and that is processed by the processor 302 during execution of the program. More specifically, the information may be stored in one or more data structures specifically configured to conserve storage space or increase data exchange performance. The instructions may be persistently stored as encoded signals, and the instructions may cause the processor 302 to perform any of the functions described herein. The medium may, for example, be optical disk, magnetic disk or flash memory, among others. In operation, the processor 302 or some other controller causes data to be read from the nonvolatile recording medium into other memory, such as the one or more memory elements 304, that allows for faster access to the information by the processor 302 than does the storage medium included in the data storage element 310. The memory may be located in the data storage element 310 or in the one or more memory elements 304, however, the processor 302 manipulates the data within the memory, and then copies the data to the storage medium associated with the data storage element 310 after processing is completed. A variety of components may manage data movement between the storage medium and other memory elements and examples are not limited to particular data management components. Further, examples are not limited to a particular memory system or data storage system.

Although the computer system 300 is shown by way of example as one type of computer system upon which various aspects and functions may be practiced, aspects and functions are not limited to being implemented on the computer system 300. Various aspects and functions may be practiced on one or more computers having a different architectures or components than that shown in FIG. 3. For instance, the computer system 300 may include specially programmed, special-purpose hardware, such as an application-specific integrated circuit ("ASIC") tailored to perform a particular operation disclosed herein. While another example may perform the same function using a grid of several computing devices running MAC OS X with IBM PowerPC processors and several specialized computing devices running proprietary hardware and operating systems.

The computer system 300 may be a computer system including an operating system that manages at least a portion of the hardware elements included in the computer system 300. In some examples, a processor or controller, such as the processor 302, executes an operating system. Examples of a particular operating system that may be executed include a Windows-based operating system, such as the Windows 8 operating system, available from the Microsoft Corporation, a MAC OS X operating system or an iOS operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 302 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C # (C-Sharp), Python, or JavaScript. Other object-oriented programming languages may also be used. Alternatively, functional, scripting, or logical programming languages may be used.

Additionally, various aspects and functions may be implemented in a non-programmed environment, for example, documents created in HTML, XML, or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++ or Python. Thus, the examples are not limited to a specific programming language and any suitable programming language could be used. Accordingly, the functional components disclosed herein may include a wide variety of elements, e.g. specialized hardware, executable code, data structures or objects, which are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

As discussed above, the processor 302 is equipped with the SIMD technology in at least one embodiment. However, even if the processor 302 is capable of executing the SIMD operation, executing the process 100 mitigates the effects of the SIMD technology because of the compulsory dual data transformation operations at acts 106 and 110 in every round, which nullifies the effects of the parallel computing operation.

The process 200, however, is able to take advantage of the SIMD technology by removing the data set transformation operations from being executed in every round. For example, and with reference to Equation (52) described above with respect to act 206, the matrix multiplication operation $A \cdot (M \cdot A_1 \cdot M^{-1}) \cdot M$ is a single instruction that can be simultaneously executed on multiple data points (e.g., each byte of input data) before the plurality of rounds is executed. Similarly, with respect to act 214, the matrix multiplication operation in Equation (59) is a single instruction that can be simultaneously executed on multiple data points (e.g., each byte of output data).

The LBox operation described above with respect to act 210 may also utilize the SIMD technology. As discussed above, the LBox operation is essentially a single table lookup operation executed on multiple data points in parallel. For example, the following matrix multiplication operation of Equation (57) can be executed on each data point, State_NI, using the SIMD technology, $$\begin{bmatrix} R & 0 & 0 & 0 \\ 0 & R & 0 & 0 \\ 0 & 0 & R & 0 \\ 0 & 0 & 0 & R \end{bmatrix} \cdot \begin{bmatrix} (M \cdot L_{i,j} \cdot M^{-1}) \\ (M \cdot L_{i,j} \cdot M^{-1}) \\ (M \cdot L_{i,j} \cdot M^{-1}) \\ (M \cdot L_{i,j} \cdot M^{-1}) \end{bmatrix} \cdot \begin{bmatrix} (M \cdot A_2 \cdot M^{-1}) \\ (M \cdot A_2 \cdot M^{-1}) \\ (M \cdot A_2 \cdot M^{-1}) \\ (M \cdot A_2 \cdot M^{-1}) \end{bmatrix}$$

$$R = A \cdot (M \cdot A_1 \cdot M^{-1})$$

As will be appreciated by one of ordinary skill in the art, the amount of execution time reduced by executing the SIMD technology is directly related to the number of data points being processed in parallel. Accordingly, the improvement in efficiency provided by SIMD increases with the size of the data being processed.

Although the foregoing description has referred primarily to encryption, one of ordinary skill in the art will recognize that the foregoing principles may be applied to decryption operations by simply inverting the encryption operation. The reciprocal nature of encryption and decryption operations in symmetric-key systems is a well-known concept in cryptography, and any reference to encryption should not be interpreted as exclusionary of the application of the principles discussed herein to decryption operations.

Furthermore, any specific numerical values given by way of example in the foregoing description should not be construed as limiting. For example, although at least one example of the foregoing description references 32 rounds per encryption operation, it is to be understood that more or less rounds may be executed. Moreover, although examples have made reference to the AES and SM4 ciphers, it is to be appreciated that the principles disclosed herein may be applied to alternate cryptographic ciphers.

The isomorphic mapping matrix identified in Equation (4) and the inverse thereof identified in Equation (5) have been given by way of example only, and it is to be understood that alternate isomorphic mapping matrices may be utilized. For example, alternate isomorphic mapping matrices are illustrated as follows, $$M_1 = \begin{bmatrix} 0 & 1 & 1 & 0 & 0 & 0 & 1 & 0 \\ 1 & 1 & 1 & 0 & 1 & 0 & 1 & 0 \\ 0 & 0 & 1 & 1 & 1 & 1 & 0 & 0 \\ 1 & 0 & 0 & 0 & 0 & 1 & 1 & 0 \\ 0 & 0 & 0 & 0 & 0 & 1 & 0 & 0 \\ 0 & 0 & 1 & 0 & 0 & 1 & 1 & 0 \\ 1 & 1 & 0 & 1 & 1 & 1 & 1 & 0 \\ 0 & 1 & 0 & 1 & 0 & 0 & 0 & 1 \end{bmatrix} \quad (60)$$

$$M_1^{-1} = \begin{bmatrix} 1 & 0 & 1 & 0 & 0 & 0 & 1 & 0 \\ 1 & 0 & 0 & 0 & 1 & 1 & 0 & 0 \\ 1 & 0 & 1 & 1 & 0 & 1 & 1 & 0 \\ 1 & 1 & 1 & 1 & 1 & 1 & 0 & 0 \\ 0 & 1 & 1 & 0 & 0 & 0 & 1 & 0 \\ 0 & 0 & 0 & 0 & 1 & 0 & 0 & 0 \\ 1 & 0 & 1 & 1 & 1 & 0 & 1 & 0 \\ 0 & 1 & 1 & 1 & 0 & 0 & 0 & 1 \end{bmatrix} \quad (61)$$

$$M_2 = \begin{bmatrix} 1 & 0 & 0 & 0 & 1 & 0 & 0 & 0 \\ 0 & 0 & 1 & 1 & 1 & 0 & 0 & 0 \\ 1 & 1 & 0 & 1 & 0 & 1 & 1 & 0 \\ 1 & 1 & 0 & 0 & 0 & 0 & 1 & 0 \\ 0 & 0 & 1 & 1 & 0 & 0 & 1 & 0 \\ 1 & 1 & 1 & 0 & 0 & 0 & 1 & 0 \\ 0 & 0 & 0 & 0 & 1 & 1 & 1 & 0 \\ 0 & 0 & 1 & 1 & 1 & 1 & 0 & 1 \end{bmatrix} \quad (62)$$

$$M_2^{-1} = \begin{bmatrix} 1 & 0 & 1 & 0 & 1 & 1 & 1 & 0 \\ 1 & 1 & 0 & 1 & 1 & 0 & 0 & 0 \\ 0 & 0 & 0 & 1 & 0 & 1 & 0 & 0 \\ 0 & 1 & 1 & 1 & 1 & 0 & 1 & 0 \\ 0 & 0 & 1 & 0 & 1 & 1 & 1 & 0 \\ 0 & 1 & 0 & 0 & 1 & 0 & 1 & 0 \\ 0 & 1 & 1 & 0 & 0 & 1 & 1 & 0 \\ 0 & 0 & 0 & 0 & 1 & 0 & 1 & 1 \end{bmatrix} \quad (63)$$

$$M_3 = \begin{bmatrix} 0 & 0 & 0 & 0 & 0 & 1 & 1 & 0 \\ 1 & 0 & 0 & 1 & 0 & 1 & 0 & 0 \\ 0 & 1 & 0 & 1 & 1 & 0 & 0 & 0 \\ 1 & 1 & 1 & 0 & 0 & 0 & 0 & 0 \\ 0 & 1 & 0 & 0 & 1 & 1 & 1 & 0 \\ 1 & 0 & 0 & 1 & 1 & 1 & 1 & 0 \\ 0 & 0 & 0 & 0 & 1 & 1 & 1 & 0 \\ 0 & 0 & 0 & 1 & 0 & 0 & 0 & 1 \end{bmatrix} \quad (64)$$

$$M_3^{-1} = \begin{bmatrix} 1 & 0 & 1 & 0 & 1 & 1 & 1 & 0 \\ 0 & 0 & 0 & 0 & 1 & 0 & 1 & 0 \\ 1 & 0 & 1 & 1 & 0 & 1 & 0 & 0 \\ 1 & 0 & 1 & 0 & 1 & 0 & 0 & 0 \\ 1 & 0 & 0 & 0 & 0 & 0 & 1 & 0 \\ 0 & 1 & 0 & 0 & 0 & 1 & 1 & 0 \\ 1 & 1 & 0 & 0 & 0 & 1 & 1 & 0 \\ 1 & 0 & 1 & 0 & 1 & 0 & 0 & 1 \end{bmatrix} \quad (65)$$

$$M_4 = \begin{bmatrix} 1 & 0 & 1 & 1 & 0 & 0 & 0 & 0 \\ 1 & 1 & 1 & 0 & 0 & 1 & 0 & 0 \\ 1 & 1 & 1 & 0 & 1 & 1 & 1 & 0 \\ 1 & 0 & 1 & 0 & 1 & 0 & 0 & 0 \\ 1 & 0 & 1 & 0 & 0 & 1 & 0 & 0 \\ 1 & 1 & 0 & 1 & 1 & 0 & 0 & 0 \\ 0 & 1 & 1 & 1 & 0 & 0 & 1 & 0 \\ 1 & 1 & 0 & 0 & 0 & 1 & 1 & 1 \end{bmatrix} \quad (66)$$

$$M_4^{-1} = \begin{bmatrix} 1 & 1 & 0 & 1 & 1 & 1 & 0 & 0 \\ 0 & 1 & 0 & 0 & 1 & 0 & 0 & 0 \\ 1 & 0 & 1 & 1 & 1 & 0 & 1 & 0 \\ 1 & 1 & 1 & 0 & 0 & 1 & 1 & 0 \\ 0 & 1 & 1 & 1 & 0 & 1 & 1 & 0 \\ 0 & 1 & 1 & 0 & 1 & 1 & 1 & 0 \\ 0 & 0 & 0 & 1 & 0 & 1 & 1 & 0 \\ 1 & 1 & 1 & 0 & 1 & 1 & 0 & 1 \end{bmatrix} \quad (67)$$

$$M_5 = \begin{bmatrix} 1 & 0 & 0 & 1 & 0 & 0 & 1 & 0 \\ 0 & 0 & 0 & 1 & 0 & 1 & 1 & 0 \\ 1 & 1 & 0 & 0 & 1 & 1 & 0 & 0 \\ 0 & 1 & 1 & 1 & 1 & 0 & 0 & 0 \\ 0 & 0 & 1 & 0 & 1 & 0 & 1 & 0 \\ 0 & 1 & 0 & 1 & 0 & 1 & 1 & 0 \\ 0 & 1 & 1 & 1 & 0 & 0 & 1 & 0 \\ 0 & 1 & 1 & 0 & 0 & 1 & 0 & 1 \end{bmatrix} \quad (68)$$

$$M_5^{-1} = \begin{bmatrix} 1 & 1 & 0 & 1 & 1 & 1 & 0 & 0 \\ 0 & 1 & 0 & 0 & 0 & 1 & 0 & 0 \\ 0 & 0 & 0 & 1 & 1 & 0 & 1 & 0 \\ 1 & 1 & 1 & 0 & 1 & 0 & 1 & 0 \\ 1 & 0 & 1 & 0 & 0 & 1 & 0 & 0 \\ 0 & 0 & 0 & 1 & 1 & 1 & 0 & 0 \\ 1 & 0 & 1 & 1 & 0 & 1 & 1 & 0 \\ 0 & 1 & 0 & 0 & 0 & 0 & 1 & 1 \end{bmatrix} \quad (69)$$

$$M_6 = \begin{bmatrix} 0 & 0 & 0 & 1 & 1 & 1 & 1 & 0 \\ 0 & 0 & 0 & 1 & 1 & 0 & 0 & 0 \\ 0 & 1 & 0 & 0 & 0 & 0 & 0 & 0 \\ 0 & 0 & 0 & 0 & 1 & 0 & 0 & 0 \\ 1 & 1 & 0 & 1 & 0 & 1 & 0 & 0 \\ 1 & 1 & 1 & 1 & 0 & 1 & 1 & 0 \\ 1 & 1 & 0 & 1 & 1 & 1 & 1 & 0 \\ 0 & 0 & 0 & 0 & 0 & 0 & 0 & 1 \end{bmatrix} \quad (70)$$

$$M_6^{-1} = \begin{bmatrix} 1 & 0 & 1 & 0 & 0 & 0 & 1 & 0 \\ 0 & 0 & 1 & 0 & 0 & 0 & 0 & 0 \\ 0 & 0 & 0 & 1 & 0 & 1 & 1 & 0 \\ 0 & 1 & 0 & 1 & 0 & 0 & 0 & 0 \\ 0 & 0 & 0 & 1 & 0 & 0 & 0 & 0 \\ 1 & 1 & 0 & 1 & 1 & 0 & 1 & 0 \\ 0 & 0 & 0 & 1 & 1 & 0 & 1 & 0 \\ 0 & 0 & 0 & 0 & 0 & 0 & 0 & 1 \end{bmatrix} \quad (71)$$

$$M_7 = \begin{bmatrix} 0 & 1 & 0 & 1 & 0 & 1 & 0 & 0 \\ 0 & 1 & 0 & 0 & 1 & 0 & 1 & 0 \\ 0 & 0 & 0 & 0 & 1 & 0 & 1 & 0 \\ 1 & 1 & 0 & 0 & 0 & 0 & 0 & 0 \\ 0 & 0 & 0 & 1 & 0 & 0 & 1 & 0 \\ 1 & 0 & 0 & 1 & 1 & 1 & 0 & 0 \\ 1 & 1 & 1 & 1 & 1 & 1 & 0 & 0 \\ 1 & 0 & 0 & 0 & 1 & 0 & 1 & 1 \end{bmatrix} \quad (72)$$

-continued $$M_7^{-1} = \begin{bmatrix} 0 & 1 & 1 & 1 & 0 & 0 & 0 & 0 \\ 0 & 1 & 1 & 0 & 0 & 0 & 0 & 0 \\ 0 & 1 & 1 & 0 & 0 & 1 & 1 & 0 \\ 1 & 0 & 1 & 1 & 1 & 1 & 0 & 0 \\ 1 & 0 & 0 & 1 & 0 & 1 & 0 & 0 \\ 0 & 1 & 0 & 1 & 1 & 1 & 0 & 0 \\ 1 & 0 & 1 & 1 & 0 & 1 & 0 & 0 \\ 0 & 1 & 0 & 1 & 0 & 0 & 0 & 1 \end{bmatrix} \quad (73)$$

Other isomorphic mapping matrices and their respective inverses, other than those identified in Equations (4), (5), and (60)-(73) may also be utilized.

Embodiments are not limited in their application to the details of construction and the arrangement of components set forth in the following description or illustrated in the drawings. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the scope of the disclosure. Accordingly, the foregoing description and drawings are by way of example only.

What is claimed is:

1. A method of executing a cryptographic cipher, the method comprising acts of:
    receiving a first finite field of data and a first finite field of a key value each represented according to a first encryption standard, the first encryption standard including a first operation and a second operation;
    transforming the first finite field of data represented by the first encryption standard into a second finite field of data represented according to a second encryption standard;
    transforming the first field of the key value represented by the first encryption standard into a second finite field of a key value represented according to the second encryption standard;
    transforming the first operation into a first modified operation represented according to the second encryption standard;
    transforming the second operation into a second modified operation represented according to the second encryption standard;
    performing a data modification operation on the second finite field of data and the second finite field of key value, the data modification operation including:
        executing the first modified operation on the second finite field of data and on the second finite field of key value to generate a third finite field of data; and
        executing the second modified operation on the third finite field of data to generate a fourth finite field of data; and
    transforming the fourth finite field of data into a fifth finite field of data represented according to the first encryption standard.

2. The method of claim 1, wherein each of the first finite field of data, the second finite field of data, the third finite field of data, the fourth finite field of data, the fifth finite field of data, the first finite field of the key value, and the second finite field of the key value is represented in the field $GF(2^8)$.

3. The method of claim 1, wherein the first encryption standard is the SM4 cipher.

4. The method of claim 1, wherein the second encryption standard is the Advanced Encryption Standard.

5. The method of claim 1, wherein each of the first finite field of data and the second finite field of data includes 16 bytes of plaintext data.

6. The method of claim 1, wherein each of the first finite field of the key value and the second finite field of the key value includes 4 bytes of RoundKey.

7. The method of claim 1, wherein each of the first operation and the first modified operation is a substitution operation.

8. The method of claim 7, wherein the substitution operation includes a multiplicative inversion function.

9. The method of claim 8, wherein the multiplicative inversion function is executed using one or both of AESDECLAST and AESENCLAST.

10. The method of claim 7, wherein the first modified operation is an isomorphic version of the first operation.

11. The method of claim 10, wherein each of the first operation and the first modified operation includes a first affine transformation and a second affine transformation.

12. The method of claim 11, wherein transforming the first operation into the first modified operation includes applying an isomorphic mapping matrix to the first affine transformation and the second affine transformation.

13. The method of claim 1, wherein each of the second operation and the second modified operation is a permutation operation.

14. The method of claim 13, wherein the second modified operation is an isomorphic version of the second operation.

15. The method of claim 14, wherein transforming the second operation into the second modified operation includes applying an isomorphic mapping matrix to the second operation.

16. The method of claim 1, wherein the fifth finite field of data includes 16 bytes of ciphertext data.

17. The method of claim 1, wherein the data modification operation is repeatedly executed for a number of rounds specified by the first encryption standard.

18. The method of claim 1, wherein transforming the first finite field of data into the second finite field of data includes transforming a plurality of data points in the first finite field of data into a plurality of data points in the second finite field of data in parallel.

19. The method of claim 1, wherein transforming the first finite field of the key value into the second finite field of the key value includes transforming a plurality of data points in the first finite field of the key value into a plurality of data points in the second finite field of the key value in parallel.

20. The method of claim 1, wherein transforming the fourth finite field of data into the fifth finite field of data includes transforming a plurality of data points in the fourth finite field of data into a plurality of data points in the fifth finite field of data in parallel.

21. The method of claim 1, wherein executing the second modified operation on the third finite field of data includes executing the second modified operation on a plurality of data points in the third finite field of data in parallel.

22. The method of claim 1, wherein executing the first modified operation on the second finite field of data is executed using Advanced Encryption Standard New Instruction Set (AES-NI) in an isolated hardware environment.

23. The method of claim 1, wherein executing the second modified operation on the third finite field of data is executed using Advanced Encryption Standard New Instruction Set (AES-NI) in an isolated hardware environment.

24. A computer system including at least one processor, the at least one processor configured to:
receive a first finite field of data and a first finite field of a key value each represented according to a first encryption standard, the first encryption standard including a first operation and a second operation;
transform the first finite field of data represented by the first encryption standard into a second finite field of data represented according to a second encryption standard;
transform the first field of the key value represented by the first encryption standard into a second finite field of a key value represented according to the second encryption standard;
transform the first operation into a first modified operation represented according to the second encryption standard;
transform the second operation into a second modified operation represented according to the second encryption standard;
perform a data modification operation, the data modification operation including:
executing the first modified operation on the second finite field of data and on the second finite field of key value to generate a third finite field of data; and
executing the second modified operation on the third finite field of data to generate a fourth finite field of data; and
transform the fourth finite field of data into a fifth finite field of data represented according to the first encryption standard.

25. The computer system of claim 24, wherein the processor is configured to use the Single Instruction Multiple Data technology to:
transform the first finite field of data represented by the first encryption standard into the second finite field of data represented according to the second encryption standard;
transform the first field of the key value represented by the first encryption standard into the second finite field of the key value represented according to the second encryption standard;
transform the fourth finite field of data into a fifth finite field of data represented according to the first encryption standard; and
execute the second modified operation on the third finite field of data to generate a fourth finite field of data.

26. The computer system of claim 24, wherein the second modified operation is an isomorphic version of the second operation.

27. The computer system of claim 26, wherein transforming the second operation into the second modified operation includes applying an isomorphic mapping matrix to the second operation.

28. The computer system of claim 24, wherein the data modification operation is repeatedly executed for a number of rounds specified by the first encryption standard.

29. The computer system of claim 24, wherein each of the first finite field of data, the second finite field of data, the third finite field of data, the fourth finite field of data, the fifth finite field of data, the first finite field of the key value, and the second finite field of the key value is represented in the field $GF(2^8)$.

30. The computer system of claim 24, wherein the first encryption standard is the SM4 cipher.

31. The computer system of claim 24, wherein the second encryption standard is the Advanced Encryption Standard.

32. The computer system of claim 24 wherein each of the first finite field of data and the second finite field of data includes 16 bytes of plaintext data.

33. The computer system of claim 24, wherein each of the first finite field of the key value and the second finite field of the key value includes 4 bytes of RoundKey.

34. The computer system of claim 24 wherein each of the first operation and the first modified operation is a substitution operation.

35. The computer system of claim 34, wherein the substitution operation includes a multiplicative inversion function.

36. The computer system of claim 35, wherein the multiplicative inversion function is executed using one or both of AESDECLAST and AESENCLAST.

37. The computer system of claim 34, wherein the first modified operation is an isomorphic version of the first operation.

38. The computer system of claim 37, wherein each of the first operation and the first modified operation includes a first affine transformation and a second affine transformation.

39. The computer system of claim 38, wherein transforming the first operation into the first modified operation includes applying an isomorphic mapping matrix to the first affine transformation and to the second affine transformation.

40. The computer system of claim 24, wherein each of the second operation and the second modified operation is a permutation operation.

41. The computer system of claim 24, wherein the fifth finite field of data includes 16 bytes of ciphertext data.

42. The computer system of claim 24, wherein executing the first modified operation on the second finite field of data is performed using Advanced Encryption Standard New Instruction Set (AES-NI) in an isolated hardware environment.

43. The computer system of claim 24, wherein executing the second modified operation on the third finite field of data is performed using Advanced Encryption Standard New Instruction Set (AES-NI) in an isolated hardware environment.

44. The computer system of claim 24 wherein each of the first finite field of data and the second finite field of data includes 16 bytes of ciphertext data.

45. The computer system of claim 44 wherein the fifth finite field of data includes 16 bytes of plaintext data.

* * * * *